United States Patent
Fritz et al.

(10) Patent No.: US 9,064,300 B2
(45) Date of Patent: Jun. 23, 2015

(54) METHOD AND SYSTEM FOR AUTOMATIC DETERMINATION OF CORONORY SUPPLY REGIONS

(75) Inventors: Dominik Fritz, Karlsruhe (DE); Michael Scheuering, Nuremberg (DE)

(73) Assignee: Siemens Aktiengesellschaft, München (DE)

( * ) Notice: Subject to any disclaimer, the term of this patent is extended or adjusted under 35 U.S.C. 154(b) by 1074 days.

(21) Appl. No.: 12/371,191

(22) Filed: Feb. 13, 2009

(65) Prior Publication Data

US 2009/0208078 A1    Aug. 20, 2009

Related U.S. Application Data

(60) Provisional application No. 61/029,036, filed on Feb. 15, 2008.

(51) Int. Cl.
    *G06K 9/00* (2006.01)
    *G06T 7/00* (2006.01)
    *G06T 7/40* (2006.01)

(52) U.S. Cl.
    CPC ..... *G06T 7/0012* (2013.01); *G06T 2207/20112* (2013.01); *G06T 2207/20156* (2013.01); *G06T 2207/30104* (2013.01); *G06K 2209/05* (2013.01); *G06T 7/0081* (2013.01); *G06T 7/402* (2013.01); *G06T 2207/10081* (2013.01); *G06T 2207/30048* (2013.01); *G06T 2207/30101* (2013.01)

(58) Field of Classification Search
    CPC ........... G06T 2207/30101; G06T 2207/30104; G06T 2207/30048; G06T 2207/20112; G06T 2207/20156; G06T 7/0081

USPC ................................................. 382/128, 131
See application file for complete search history.

(56) References Cited

U.S. PATENT DOCUMENTS

| | | | |
|---|---|---|---|
| 3,069,654 A | | 12/1962 | Hough |
| 7,197,170 B2 * | | 3/2007 | Dwyer et al. ................. 382/128 |
| 7,702,137 B2 * | | 4/2010 | Dwyer et al. ................. 382/128 |
| 7,764,813 B2 * | | 7/2010 | Lorenz ........................ 382/128 |
| 7,860,283 B2 * | | 12/2010 | Begelman et al. ............ 382/128 |

(Continued)

OTHER PUBLICATIONS

Boskamp, T., et al., "New Vessel Analysis Tool for Morphometric Quantification and Visualization of Vessels in CT and MR Imaging Data Sets," Radio Graphics, Jan.-Feb. 2004, RG vol. 24, No. 1, © RSNA, 2004, pp. 287-297.

(Continued)

*Primary Examiner* — Sultan Chowdhury
*Assistant Examiner* — Bao-Luan Le
(74) *Attorney, Agent, or Firm* — Lempia Summerfield Katz LLC

(57) ABSTRACT

A method and system for automatically associating coronary arteries with regions of the myocardium to which the arteries supply blood is described. The method uses three dimensional image data of a patient, and an axial image slice is used to identify candidate locations of the aorta. Candidate aorta centroid locations are evaluated to eliminate spurious identifications, and the identified aorta is used to locate the left ventricle of the heart with respect thereto. Arteries of the coronary artery tree may be located by segmentation of contrasted images, and the individual arteries may be identified by skeletonization of the segmented arteries. The skeletonized arteries are projected onto an image of the patient heart, and may be associated with specific regions of the myocardium.

26 Claims, 16 Drawing Sheets

(56) References Cited

U.S. PATENT DOCUMENTS

| | | | |
|---|---|---|---|
| 7,873,194 B2* | 1/2011 | Begelman et al. | 382/128 |
| 7,940,970 B2* | 5/2011 | Levanon et al. | 382/128 |
| 7,940,977 B2* | 5/2011 | Begelman et al. | 382/133 |
| 7,983,459 B2* | 7/2011 | Begelman et al. | 382/128 |
| 2004/0087853 A1* | 5/2004 | Fujisawa | 600/425 |
| 2005/0249392 A1* | 11/2005 | Allain et al. | 382/128 |
| 2005/0281447 A1* | 12/2005 | Moreau-Gobard et al. | 382/130 |
| 2006/0056694 A1* | 3/2006 | Rinck et al. | 382/173 |
| 2006/0239553 A1* | 10/2006 | Florin et al. | 382/173 |
| 2006/0239554 A1* | 10/2006 | Sun et al. | 382/173 |
| 2006/0241412 A1* | 10/2006 | Rinck et al. | 600/431 |
| 2006/0280351 A1* | 12/2006 | Luping et al. | 382/128 |
| 2007/0025616 A1* | 2/2007 | Grady et al. | 382/173 |
| 2007/0031019 A1* | 2/2007 | Lesage et al. | 382/131 |
| 2007/0047792 A1* | 3/2007 | Scheuering et al. | 382/128 |
| 2007/0165917 A1* | 7/2007 | Cao et al. | 382/128 |
| 2007/0297561 A1* | 12/2007 | Breeuwer et al. | 378/4 |
| 2008/0080757 A1* | 4/2008 | Scheuering et al. | 382/131 |
| 2008/0101667 A1* | 5/2008 | Begelman et al. | 382/128 |
| 2008/0101674 A1* | 5/2008 | Begelman et al. | 382/130 |
| 2008/0103389 A1* | 5/2008 | Begelman et al. | 600/425 |
| 2008/0170763 A1* | 7/2008 | Begelman et al. | 382/128 |
| 2008/0188734 A1* | 8/2008 | Suryanarayanan et al. | 600/407 |
| 2008/0219530 A1* | 9/2008 | Levanon et al. | 382/130 |
| 2009/0177089 A1* | 7/2009 | Govari et al. | 600/453 |
| 2009/0185731 A1* | 7/2009 | Ray et al. | 382/131 |

OTHER PUBLICATIONS

Cerqueira, M., et al., "Standardized Myocardial Segmentation and Nomenclature for Tomographic Imaging of the Heart," Circulation, Jan. 29, 2002, © 2002 American Heart Association, Inc., pp. 539-542.

Duda, R., et al., "Use of the Hough Transformation to Detect Lines and Curves in Pictures," Communications of the ACM, Jan. 1972, vol. 15, No. 1, © 1972, Association for Computing Machinery, Inc., pp. 11-15.

Fritz, D., et al., "Automatic 4D-Segmentation of the Left Ventricle in Cardiac-CT-Data," further author information: (Send correspondence to D. Fritz), E-mail: dfritz@ira.uka.de; Telephone: –49-721 608 4261, 11 pages.

Hennemuth, A., et al., "One-click coronary tree segmentation in CT angiographic images," International Congress Series 1281 (2005), © 2005 CARS & Elsevier B.V., pp. 317-321.

Kimme, C., et al., "Finding Circles by an Array of Accumulators," Communications of the ACM, Feb. 1975, vol. 18, No. 2, © 1975, Association for Computing Machinery, Inc., pp. 120-122.

Lorenz, C., et al., "Fast automated object detection by recursive casting of search rays," International Congress Series 1281 (2005), © 2005 CARS & Elsevier B.V., pp. 230-235.

Shahrokni, A., et al., "Fast skeletonization algorithm for 3-D elongated objects," Medical Imaging 2001: Image Processing, Proceedings of SPIE vol. 4322 (2001) © 2001 SPIE, pp. 323-330.

* cited by examiner 1. basal anterior
2. basal anteroseptal
3. basal inferoseptal
4. basal inferior
5. basal inferolateral
6. basal anterolateral
7. mid anterior
8. mid anteroseptal
9. mid inferoseptal
10. mid inferior
11. mid inferolateral
12. mid anterolateral
13. apical anterior
14. apical septal
15. apical inferior
16. apical lateral
17. apex

FIG. 3B
FIG. 3A

METHOD AND SYSTEM FOR AUTOMATIC DETERMINATION OF CORONORY SUPPLY REGIONS

This application claims the benefit of US provisional application No. 61/029,036, filed on Feb. 15, 2008, which is incorporated herein by reference.

TECHNICAL FIELD

The present application relates to a method and system for automatically analyzing an image to identify an association of a myocardial region with a coronary vessel.

BACKGROUND

Coronary artery disease (CAD), which is the end result of the accumulation of atheromatous plaques within the walls of the arteries that supply the myocardium, remains the number one cause of disability and death in modern industrialized countries. In 2005, the estimated direct and indirect cost of CAD in the US is $393.5 billion. In the US in 2001, nearly 900,000 Americans experienced a new or recurrent heart attack, or acute myocardial infarction.

Stenosis, or narrowing of the cardiac arteries, is usually caused by plaque in a blood vessel. Plaque forms when cholesterol, fat and other substances build up in the inner lining of an artery. This process is called atherosclerosis. For assessing the hemodynamic relevance of a stenosis, in addition to the degree of stenosis, the relationship to the myocardial region of the coronary arteries is of particular interest.

With the advent of a new generation of imaging modalities, such as multi-slice scanners, like the Somatom Sensation 64 or the Somatom Definition (available from Siemens AG, Munich, Germany), and similar devices, cardiac computerized tomography (CT) has become a non-invasive alternative for imaging coronary arteries. CT imaging, with or without intravenous iodine-based contrast, can reliably visualize cardiac anatomy A conventional association of the coronary arteries with the myocardial regions may be made using the "Standardized Myocardial Segmentation and Nomenclature for Tomographic Imaging of the Heart" in the form of so-called polar maps and by the 17-segment model of the American Heart Association (AHA), as set forth in an AHA Scientific Statement (2002). FIG. 1A shows the recommended left ventricular segmentation and associated descriptive nomenclature, and FIG. 1B shows the association of the coronary arteries with each of the 17 myocardial segments. However, this association has been caveated with the recognition that there is tremendous individual variability in the location of the coronary vessels. This model is based on statistical data and thus cannot necessarily reproduce the high anatomical variability of the coronary anatomy of an individual patient.

SUMMARY

A method of automatically associating coronary arteries with respect to a location of a portion of a patient heart using three dimensional image data is disclosed, the method including the steps of: identifying a location of an aorta; identifying a location of a left ventricle; segmenting a coronary artery tree; associating a coronary artery of the artery coronary tree with a location of a portion of a patient heart.

In an aspect, a computer program product has instructions stored on a computer readable medium and may be used to: configure a computer to analyze three dimensional image data of a patient to identify the location of the aorta; to identify a location of a left ventricle; segment a coronary artery tree; and to associate a coronary artery of the coronary artery tree with a location of a portion of a patient heart.

In another aspect, a system for diagnosing a patient is disclosed, the system including a graphical display and a computer. The computer is configured to receive image data from a three dimensional data set obtained by an imaging modality and to: choose an image slice from the image data so that the longitudinal axis of the aorta of the patient is disposed substantially orthogonal to the plane thereof and determine candidate lumen centroids of the aorta; validate a centroid as corresponding to the aorta; segment the aorta and coronary artery tree; identify the major arteries of the coronary artery tree; associate the identified arteries of the coronary artery tree with spatial locations on a myocardium of the patient; and to display a map of the myocardium on the graphical display, with the identified arteries superimposed thereon.

BRIEF DESCRIPTION OF THE DRAWINGS

FIG. 3(A) is a portion of an axial-slice image from a CTA data set having the aorta and other portions of a patient anatomy; and (B) is the image of FIG. 3A transformed so as to be a gradient image;

DETAILED DESCRIPTION

Exemplary embodiments may be better understood with reference to the drawings. In the interest of clarity, not all the routine features of the implementations described herein are described. It will of course be appreciated that in the development of any such actual implementation, numerous implementation-specific decisions must be made to achieve a developers' specific goals, such as compliance with system and business related constraints, and that these goals will vary from one implementation to another.

A method is described for automatic determination of the main branches of the coronary artery tree, and the automatic determination, of the supply regions of the myocardium, for each branch of the coronary artery tree. The method permits the patient-specific supply regions of the main axes of the coronary tree to be determined automatically and displayed on a polar map of the myocardium. In comparison to the 17-segment AHA model used previously, the anatomical variability of the coronary tree can be better taken into account, and correct supply regions of the myocardium can be determined even with coronary trees that deviate from the norm. The association of myocardial regions and the vessels supplying them with blood may permit a combined assessment of stenoses and wall motion parameters in an individual patient to be performed by the physician.

The method of associating the coronary arteries with the regions of the myocardium is substantially automatic once a set of multi-slice computed tomography (CT) images is obtained. Although the data obtained using CT devices of differing manufacture, and with differing parametric settings, is not uniform in characteristics, the spatial resolution (voxel size), dynamic range and the like, are compatible with the methods described herein. Generally, the image data is stored in a DICOM-compatible system (Digital Communications in Medicine), and the relevant parameters are stored in association with the image data, so that appropriate parameterization of the analysis may be done in accordance with the retrieved image data. Other systems for storage of image data sets and equipment parameters and patient information are known and may be used. The specific form in which the information is stored or retrieved is not a limitation herein.

Figure 2:
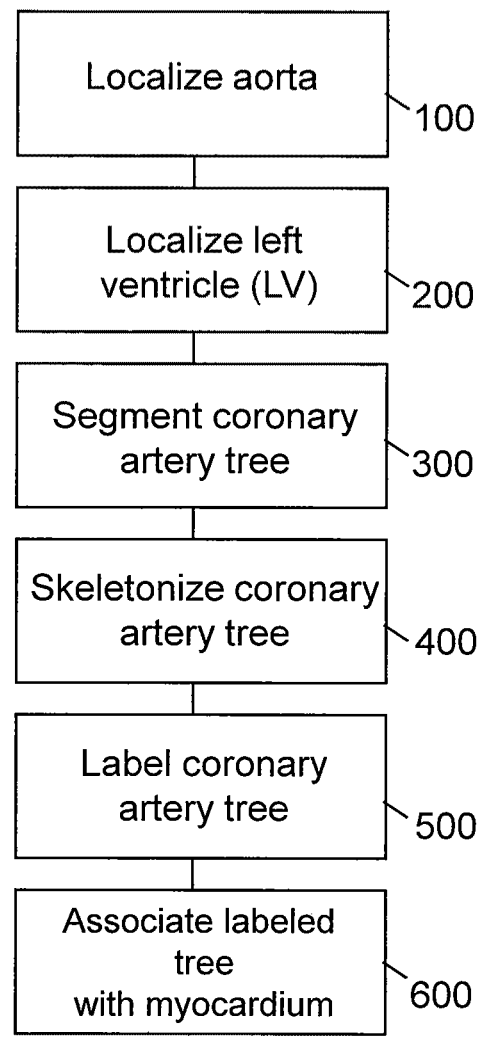
FIG. 2 is a block diagram of an embodiment of a method of associating regions of the myocardium with blood supply by the coronary artery tree.

The method 5, as illustrated in FIG. 2, comprises the acts of localization of the aorta (step 100); localizing the left ventricle (step 200); segmenting the coronary artery tree (step 300); skeletonization of the coronary artery tree (step 400); automatically labeling the coronary artery tree (step 500); and, associating the labeled coronary arteries with regions of the myocardium (step 600).

Herein, the term "heuristic" is intended to mean a selection criteria based on either experimental data or analysis of a structure or image that may be used to effectively distinguish between two alternate hypotheses. This may be a parameter such as a size, a range of sizes, relative sizes, a grey scale threshold, or the like.

The examples presented illustrate examples of the details of acts in the method. Such steps may be performed using a variety of analysis techniques; however, the experimental data presented was processed using the techniques as described.

In an aspect, an act 100 is performed on one or more axial slices of a computed tomography angiogram (CTA) data set having data associated with a coronary artery, where the axis of the coronary artery is expected to be substantially orthogonal to the slice plane. Generally, the shape of the cross section of a coronary artery lumen is approximately circular, and the image of the artery in the axial plane would be a circle when the axial slice is located in approximately the mid-cavity location of the left ventricle and where the longitudinal axis of the lumen is substantially orthogonal the image plane.

Figures 1A, 1B:
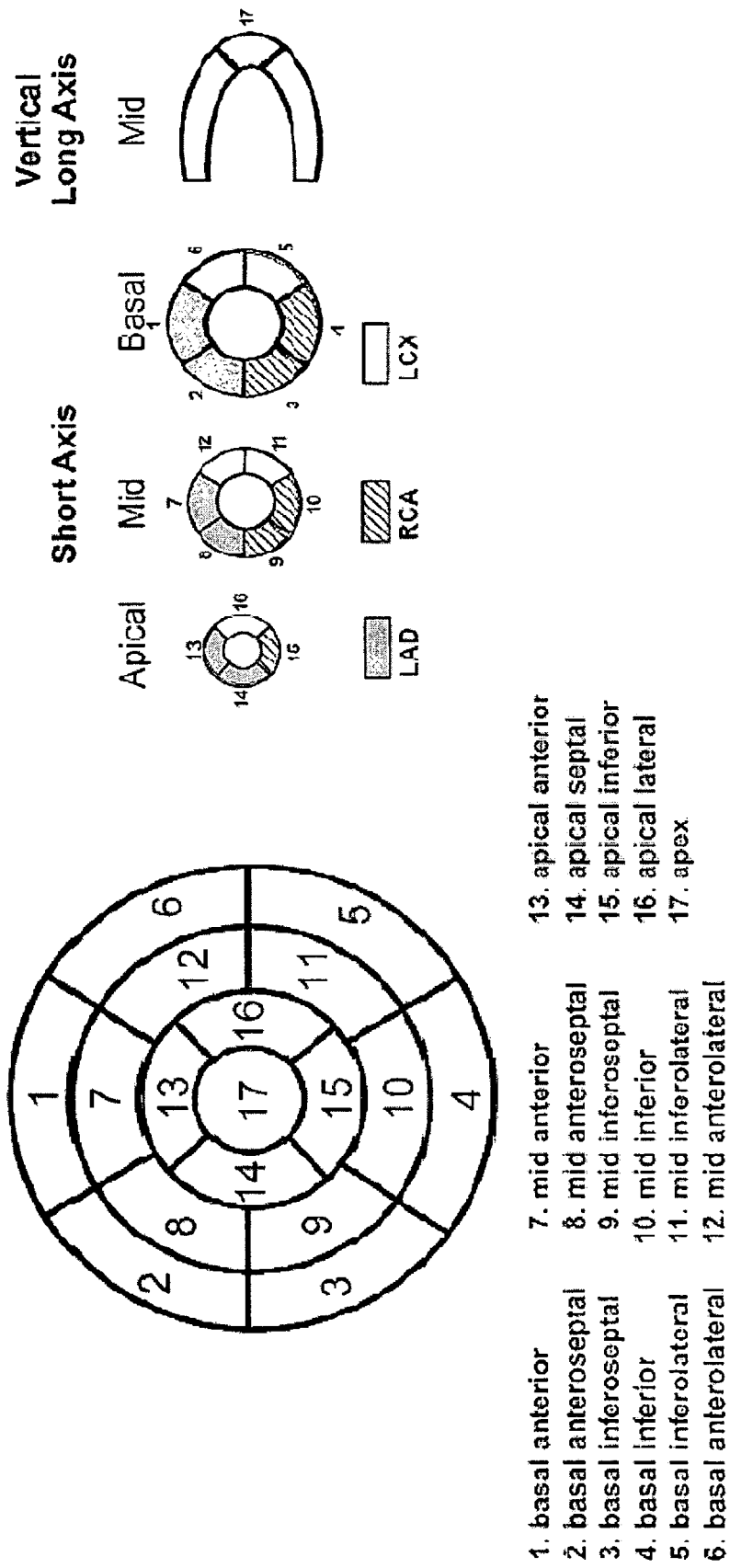
FIG. 1 shows (A) a display on a circumferential polar plot of the 17 myocardial segments and recommended nomenclature for tomographic imaging of eh heart (prior art); and (B), an assignment of the 17 myocardial segments to the territories of the left anterior descending (LAD), right coronary artery (RCA) and the left circumflex coronary artery (LCX) (prior art).

Myocardial segments may be named and located with respect to the long axis of the ventricle and with respect to the circumferential location thereof in a short axis direction. Basal, mid-cavity and apical as part of the name defines the location along the long axis of the ventricle from the apex to the base. As seen in FIG. 1A, the segments of the myocardium of the left ventricle are also assigned nomenclature in the azimuthal direction.

FIG. 3A shows a portion of a representative slice of a multi-slice angiographic CT image (MS-CTA) data set which includes the heart region. The slice also includes portions of the anatomy such as thoracic cavity and the spine. In this example, the aorta is being used as a central landmark. In the axial image projection, a circle having a known range of radii is located in the data set as being the surface of the lumen of the aorta. The image has been obtained using a contrast agent in the blood, so the lumen of the arteries can be visualized. An analysis method for automatically identifying circular objects in an image is a circular Hough transform, although other analysis techniques may be used.

The slice image data is first converted into a gradient image, as shown in FIG. 3B, where the intensity of the image is proportional to the rate of change of gray scale of the image. The image gray scale is usually expressed in Hounsfield Units (HU). This is a linear transformation of the gray scale intensity where air has a value of −1000 HU and water has a value of 0 HU. The images of FIGS. 3A and B are from the same CTA slice data, and the data processing performed to yield FIG. 3B is intended to emphasize the edges between structures having substantially different image densities in HU.

Figure 4B:
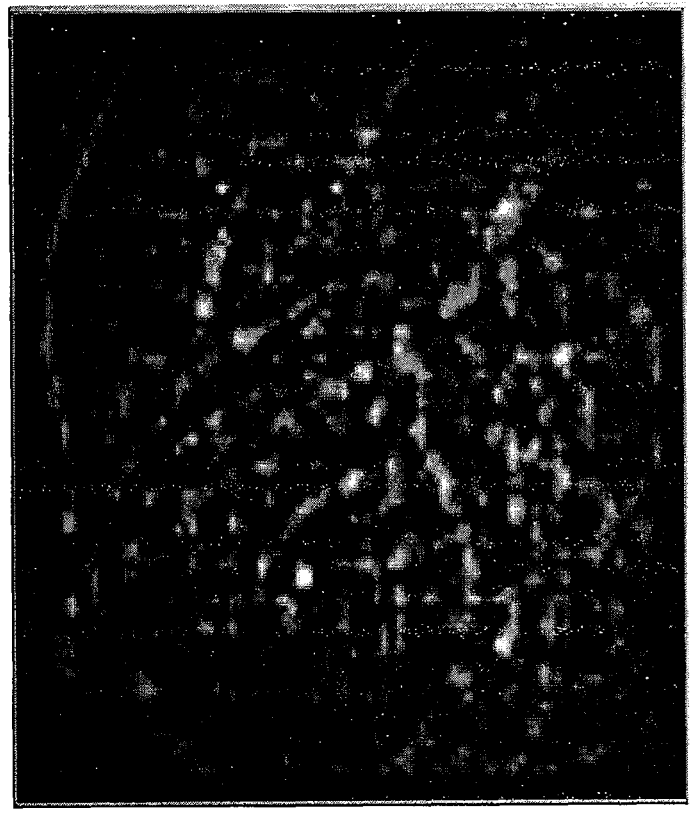
FIG. 4(A) is a Hough-space diagram of the data in FIG. 3B for a candidate aorta radius; and (B) is the Hough space image, normalized with respect to a local mean value thereof.
Figure 4A:

The Hough transform maps the image space of FIG. 3B, for example, $(x, y, z_1)$ to a parameter space $(x, y, z_1, r)$, where $r$ is the radius of the circle in image space $(x, y, z_1)$, where $z_1$ is the location of the axial slice. FIG. 4A shows the Hough space for a fixed radius $r$. The transformed data may be further processed, for example by applying a peak enhancement filter comprising subtracting a local mean value from each Hough space value, yielding the result shown in FIG. 4B, where the visibility of possible locations of the circle center is enhanced. The Hough space for a range of values of the parameter $r$, consistent with the expected range of radii of an aorta may be searched for candidate aorta locations. The threshold value for a candidate aorta location may be dependent on the radius thereof.

Figure 5A:
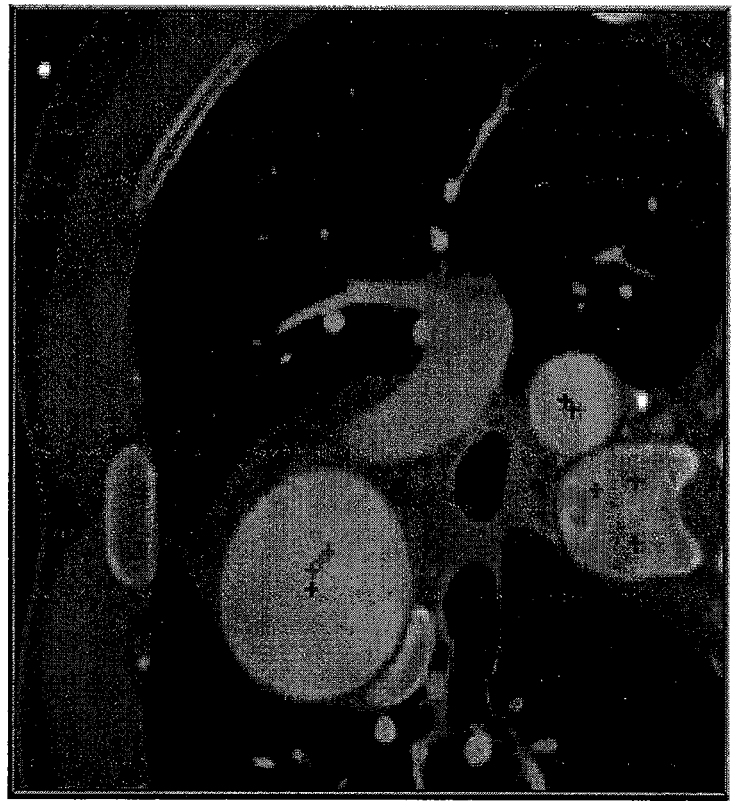
FIG. 5(A) is the image of FIG. 3A where the candidate aorta centroid locations are shown by a "+" symbol.
Figure 5B:
FIG. 5(B) is image of FIG. 5A where candidate centroid locations are filtered so that they lie in regions having Hounsfield densities corresponding to contrasted blood.

As shown in FIG. 5A, a plurality of possible aorta centroid locations may be identified, some of which are correct, some of which may be other blood vessels, and others may be other body structures. Each candidate centroid location is indicated by a "+". Further filtering may be applied to the data using known attributes of the contrasted aorta. For example, the value, in HU, of contrasted blood is greater than 200 HU. FIG. 5B shows the result of applying this filter acting to define a permitted region for candidate centroid locations. However, there still appear to be some spurious locations associated with the spine and sternum. Each of the candidate points may be evaluated for plausibility as being a location of an artery. Clusters of candidate points are observed. Such clusters may arise from a slightly elliptical shape of the coronary artery, or from a slightly elliptical projection of a circularly artery in the image slice.

Figure 6B:
FIG. 6(B) shows an ellipsoid corresponding the rays obtained by a Principal Component Analysis (PCA) (negative views shown)
Figure 6A:
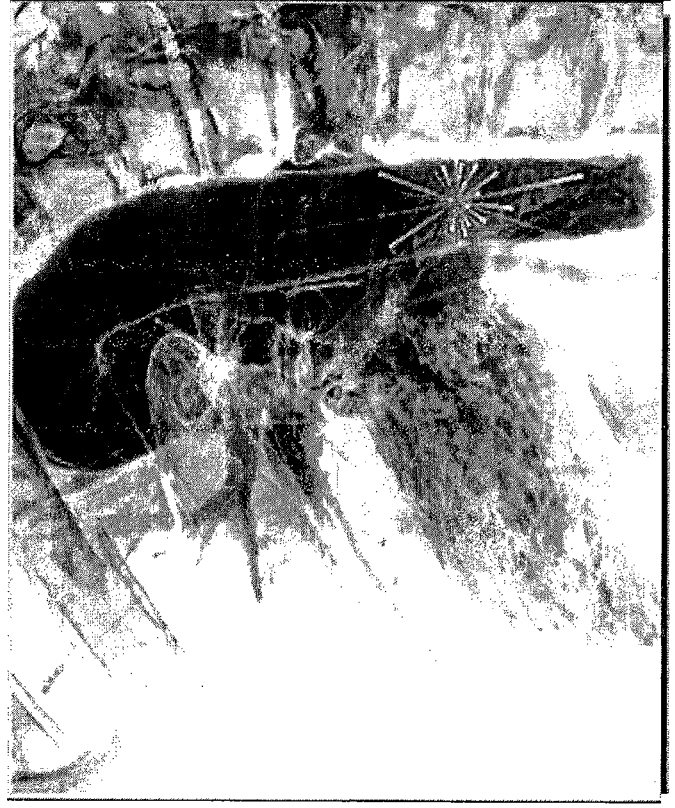
FIG. 6(A) shows an example of ray casting using a candidate centroid location in a plane orthogonal to the axial plane.

As an example of further filtering criteria, the orientation, the eccentricity and the average of the two smaller radii of the ellipsoid having a centroid corresponding to a candidate centroid may be used. Using the candidate artery centroid location in the axial plane spherical rays may be cast in the 3-dimensional image space so as to determine the local vessel boundaries. The change in image density and the rate of change in image density may be used to define the intersection of the projected ray with the boundary of the lumen or other bodily structure. FIG. 6A shows the rays originating from a candidate centroid location, and FIG. 6B shows the corresponding characterizing ellipsoid. The data may be subject to, for example, a principal component analysis (PCA), to determine the best fit ellipsoid model. The ellipsoid represents the lumen of the aorta at the cross section of the aorta corresponding to the origin of the projected rays.

Then, the heuristic filter used may be that: (a) the principal axis of the ellipsoid is substantially parallel to the z-axis, since the artery was presumed to be oriented perpendicular to the axial plane; (b) the eccentricity of the ellipse is below a threshold value, as the aorta is approximately circular; and (c), the average of the two smaller radii substantially corresponds to the radius that was used for the mapping from image space to Hough space. Other heuristics may be used. This technique may also be used to identify other bodily structures by selecting appropriate heuristics.

Figure 5C:
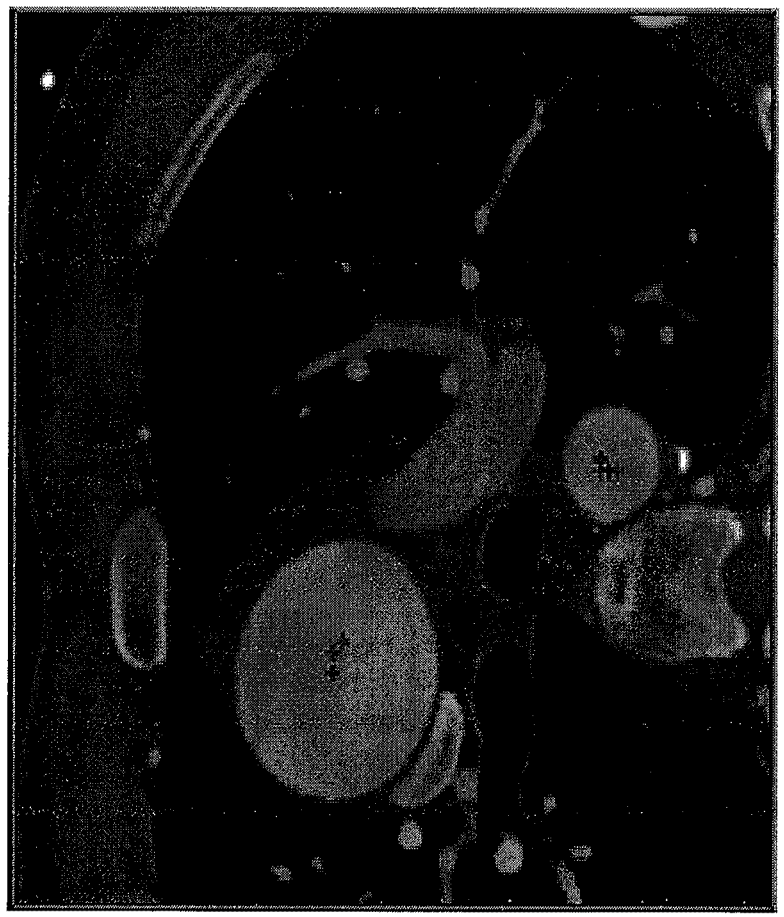
FIG. 5(C) is the image of FIG. 5B where the candidate centroid points meet a heuristic related to the orientation and ellipticity of a fitted ellipsoid.

The result of employing these heuristics is shown in FIG. 5C, where the candidate locations are reduced to essentially those associated with arteries. The initial location of the aorta associated with one of the remaining candidate centroids is propagated by associating a cylinder model with the vessel segment around the candidate centroid, where the cylinder has a specified height. The initial cylinder section may be extended incrementally in both directions as a chain of cylinders by translating the cylinder coordinate position along the direction of the axis of the current cylinder so as to define a new cylinder position as an extension of the cylinder chain. The cylinder chain is extended until either a change in axial direction or a change in radius exceeds a threshold, or until the approximated radius is not longer a plausible aorta radius. As is evident in FIG. 5C, there may be more than one candidate starting location.

Once the cylinder has been extended as far as possible using the above described approach, other possible candidate centroid locations that lie within the cylinder are eliminated from consideration; a new chain of cylinders may be started using another of the remaining candidate centroid points, and the process repeated until there are no remaining candidate points. The elimination of candidate locations within an already identified cylinder chain reduces the computational load, as such candidate locations are expected to be redundant.

If more than one cylinder chain is found, the appropriate cylinder chain is selected using a heuristic, which may include the following criteria:

if one cylinder chain contains an arch (that is if the position of the cylinder chain closest to the patient head is not one of the chain end points) the chain is determined to be the aorta as there is no other structure in a thoracic data set having this characteristic; or if none of the chains contains an aortic arch, the chain with the largest radius at one of the chain end points is selected.

The latter of the criteria accounts for a situation where the aortic arch region is truncated in the image data set.

Figure 7:
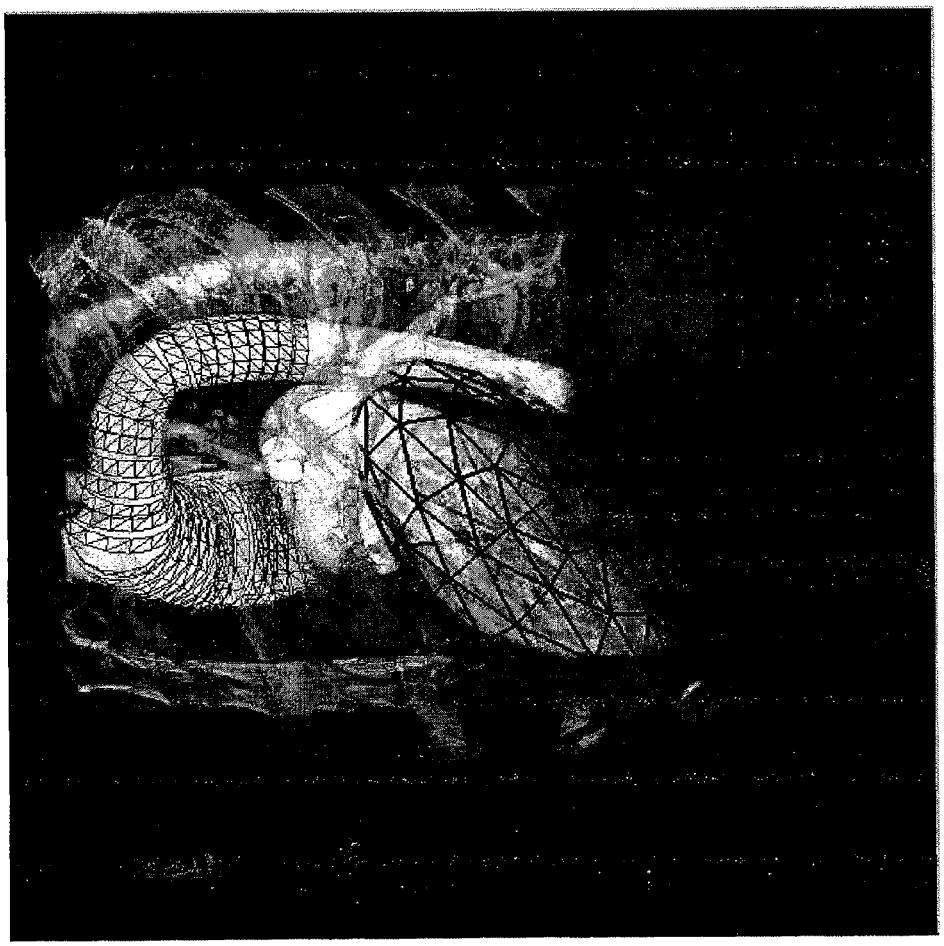
FIG. 7 shows a three dimensional view of the heart and aorta where the left ventricle (LV) is identified with an ellipsoid and the aorta is defiled by cylindrical segments.

The left ventricle (LV) may be spatially localized (step 200) by continuing to extend the cylinder chain model of the identified aorta so as to pass through the aortic valve, and to use ray casting to identify the boundaries of the interior of the heart. An ellipsoid model may then be used, similarly to the method described above, so as to represent the left ventricle (LV) location. The result of steps 100 and 200 may be seen in FIG. 7.

Segmenting the coronary artery tree (step 300), is an adaptation of a known method, except that the results of steps 100 and 200 are used to provide an automated identification of the starting point or "seed" point for the segmentation algorithm (step 300). One such a method is described in Hennemuth et al., "One-click coronary tree segmentation in CT angiographic images" International Congress Series 12981 (2005) 317-321 (Elsevier B. V.). The method uses a slice by slice 2D region growing algorithm. Statistical information about the gray scale value distribution in a predefined neighborhood is used to prevent the segmentation from leaking through the boundary through small artifacts such as image noise or plaque.

Figures 8A, 8B:
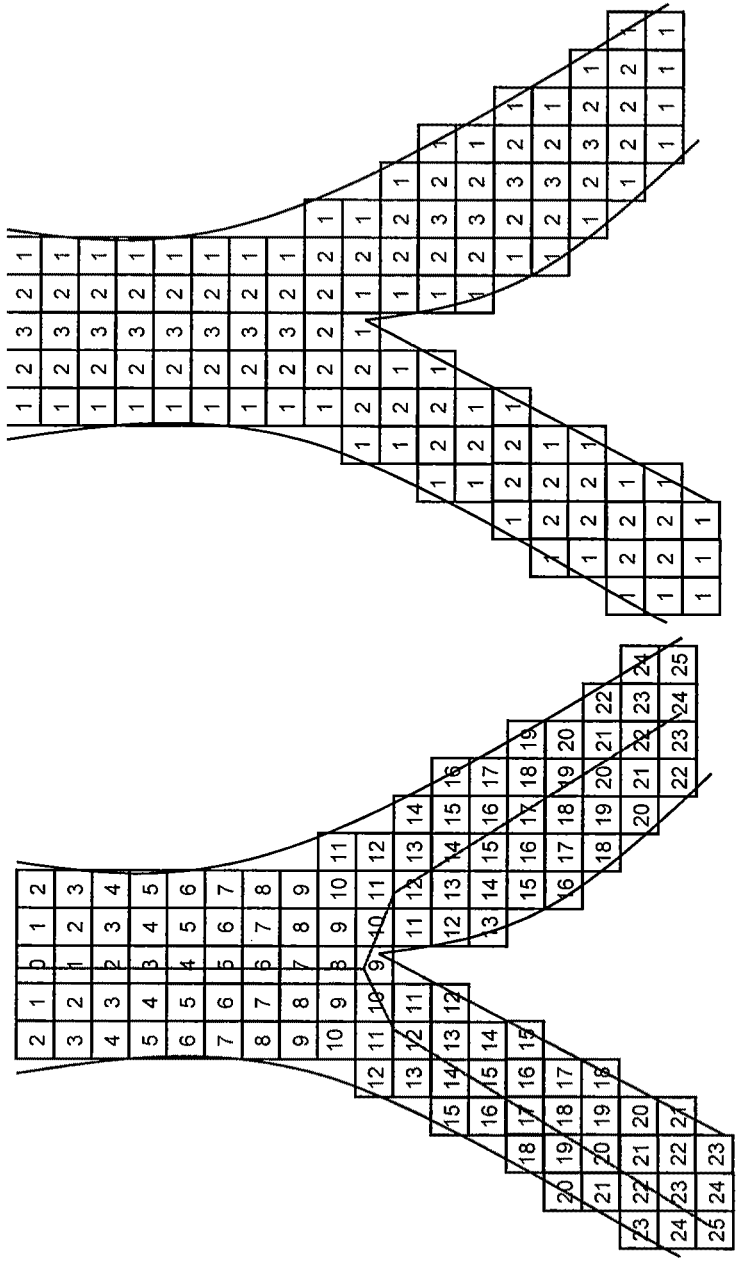
FIG. 8(A) is a schematic showing a branching artery where a binary map of the pixels of the lumen are identified by a boundary seeded (BS) algorithm; and (B) the same binary map identified by a single-seeded (SS) algorithm.

When the segmentation of the aorta and the coronary arteries has been performed, the interior of the lumens thereof may be represented by a binary mask. This mask may be used as a basis for the skeletonization of the segmented coronary tree, as skeletonization facilitates identifying the individual branches of the tree. The skeletonization (step 400) may be performed by the use of two different distance transforms. A branching structure may be characterized by a boundary-seeded (BS) transform and a single-seeded (SS) distance transform. The BS transform encodes the distance for each voxel of the binary mask as the distance to the nearest boundary of the vessel in the cross-sectional dimension (FIG. 8B), and the SS transform encodes the distance of each voxel to a seed voxel (FIG. 8A). For this example, the seed voxel for the SS transform is at the top center of the structure and has a zero distance to itself. The SS value of each voxel may be used to transform the binary mask of the coronary tree into a directed graph. All voxels with equal SS values are then clustered. Based on the BS value, a representative for each cluster is selected. Further, for each cluster, the parent node is defined as the cluster with a SS value of n−1. The line connecting the parent nodes, running down the middle of the main portion of the binary mask region in FIG. 8A, and branching into two at the division of the vessels is the skeleton representation of the coronary tree.

In healthy patients, the coronary arteries supplying the myocardium consist of two main arteries: the right (RCA) and left (LCA) coronary arteries, with the latter branching into the circumflex artery (LCX) and the left anterior descending artery (LAD). The two ostia where the coronary arteries branch away from the aorta vary in order and location from individual-to-individual. However, one may assume that the cross-section of the aorta is substantially elliptical, that the coronary arteries arise substantially orthogonal to the aorta, and that a person has no more than two coronary arteries and two bypasses.

The skeletonized coronary tree is used in identifying the coronary arteries (step 500). The tree is first divided into a right part (the RCA) and the left part (the LCA). Subsequently the LCA is divided into the LAD and the LCX. Choosing a first node as the place where child trees are at least of a defined minimum size could result in a false selection of the LCA and the RCA. The node may be better characterized by requiring that, for example, the branching node better divides the tree into two equal size sub-trees than any other candidate node. Differentiating the LCA from the RCA depends on the location of the arteries with respect to the left ventricle (LV). The LV location was determined in step 300, and the LCA and the RCA can be identified by comparing the center of gravity of the left ventricle with the center of gravity of the two branches.

Figure 9:
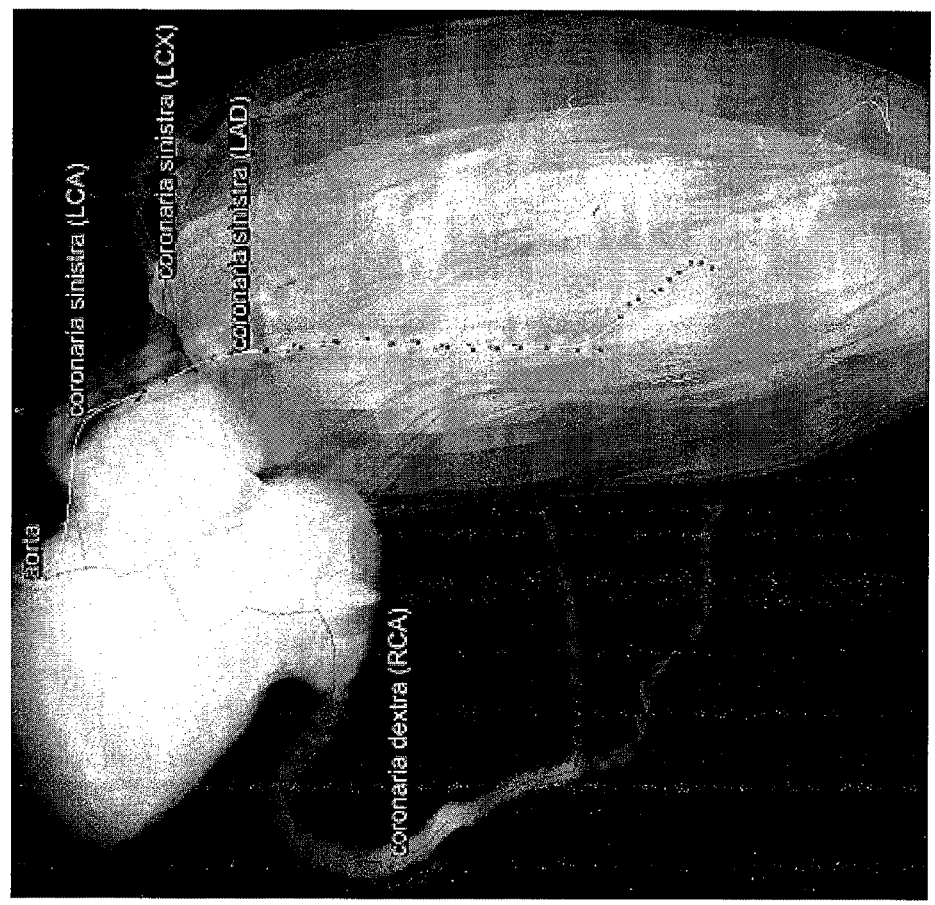
FIG. 9 is a segmented representation of the image of the heart and coronary artery tree showing the identified coronary arteries.

The further division of the LCA into the LAD and the LCX may be performed by applying the same approach as was used for the subdivision into the LCA and the RCA. However, as the LAD and the LCX run around the LV, the use of the center of gravity is not the heuristic of choice. Here, the difference is that the LAD is oriented approximately parallel to the direction of the principal axis of the LV though the apex region, and the LCX runs approximately around the principal axis of the LV. FIG. 9 shows the result of performing the step of automatically identifying the main branches of the coronary artery tree.

Figure 10:
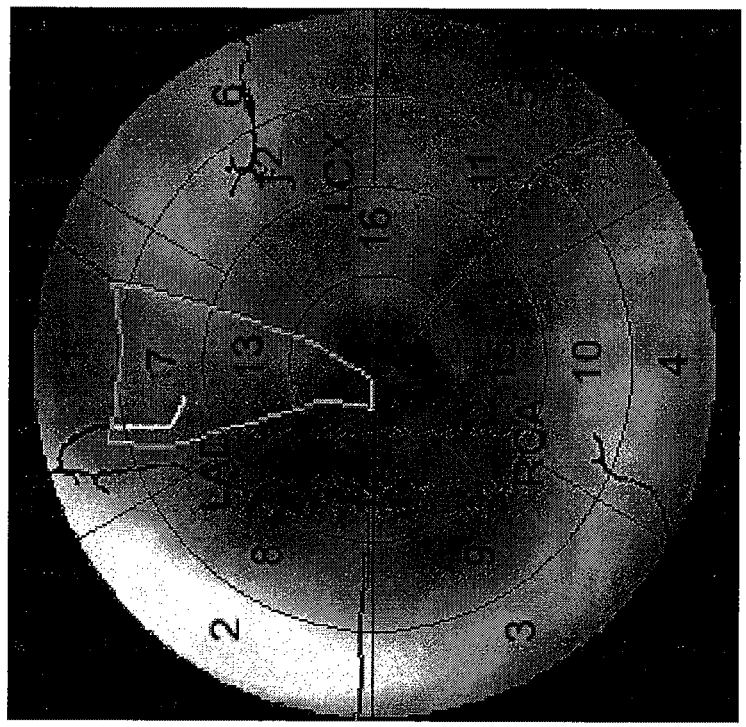
FIG. 10 shows the projection of the segmented myocardium of the heart onto a polar map, with the overlay of the identified skeletonized coronary arteries and divided into supply regions; the AHA 17-component model is also shown.

Having identified the coronary tree vessels, step 600 associates the vessels with the myocardial surface. The patient myocardial surface may be mapped onto a polar map. That is, each point on the left ventricular surface is mapped from a 3D cylindrical coordinate frame (r, h, φ) to a 2D polar coordinate frame, where the apex of the heart corresponds to the center of the polar map and the base of the heart corresponds to the outer boundary of the polar map. To avoid a possible singularity, the region near the apex is treated as a spherical 3D coordinate frame. FIG. 10 shows this mapping, where the 17 AHA regions of FIG. 1 are shown as being superimposed on the heart image.

The automatically labeled branches of the coronary artery tree may be mapped onto the polar map projection by computing a ray from each pixel of the polar-mapped image to determine if the ray intersects with coronary artery tree. Where an intersection is found, and the intersection is not occluded by the right ventricle, the corresponding pixel of the polar map is marked as a vessel. Once the coronary artery tree has been projected onto the polar map, the polar map may be associated with the supply regions of the three main regions by determining, for each pixel of the polar map, the closest branch of the coronary artery tree. One computational approach to making this association is a Voronoi transformation, although other algorithms may be used.

The three regions of blood supply to the patient heart are shown as the approximately radial lines in FIG. 10. In this example, there is general agreement between the standard blood supply model and the result obtained by the method 5 of FIG. 2. However, it is also evident that there are differences in detail that may be clinically significant.

Figure 11:
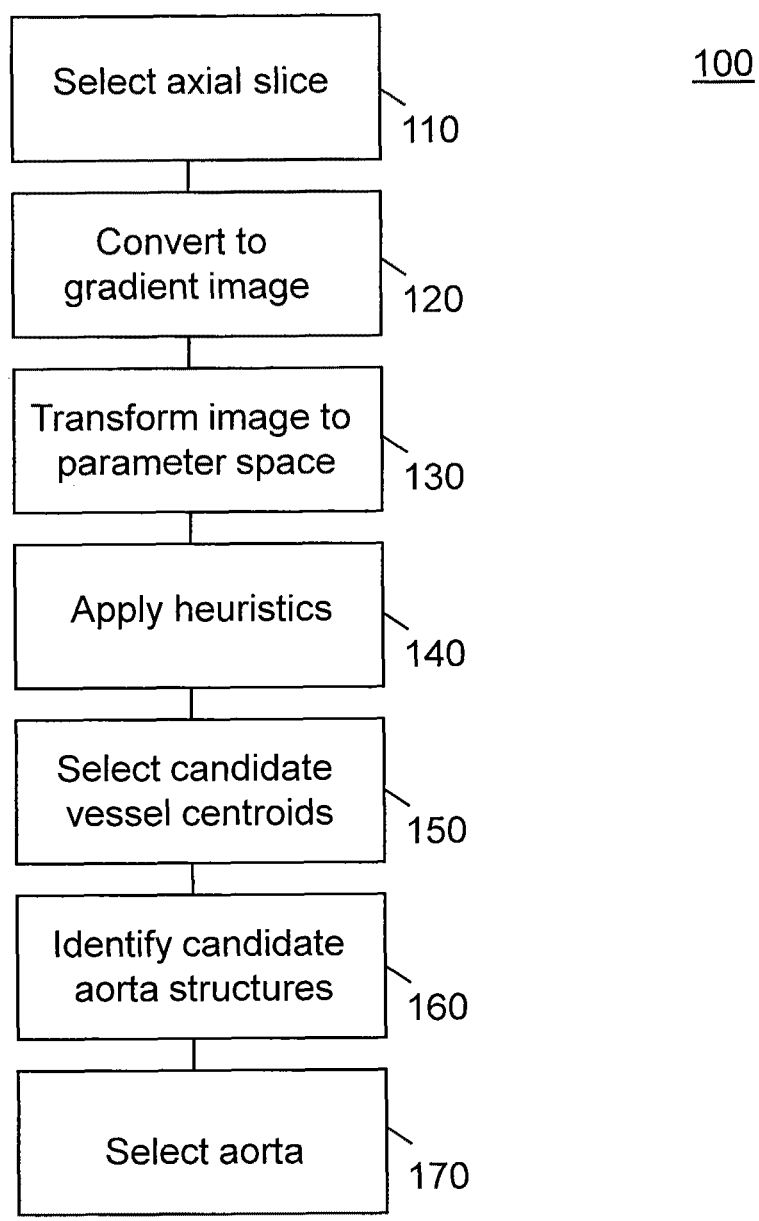
FIG. 11 is a detail of the steps in step 100 of FIG. 2.

In more detail, the step of localizing the aorta (100; FIG. 11) is performed by selecting an axial slice from the three dimensional data of the patient (110). This slice may be a recently obtained image data set, where the patient is currently being diagnosed or treated, or an image data set that has previously been stored, for example in a DICOM-compatible data base, or the like. The image slice would be representative of the axial plane at approximately a mid-cavity position of the patient heart. The image extent should encompass the heart and related vessels. Sometimes, the images available truncate the aorta above the heart. A method of accommodating such images has already been described. The images of the data set may be images obtained using a contrast agent, so as to better visualize the blood vessels and distinguish them from tissues having comparable image densities. The selected axial slice image is transformed so that the value of a spatial point is proportional to the rate of change of image density (step 120). This is sometimes called a "gradient image". Other forms of edge detection may be used to better differentiate the boundaries between bodily structures.

The gradient image may be analyzed to identify image structures with circular or approximately circular characteristics (step 130). This may be by transforming the spatial coordinate values, for example in Cartesian (image) coordinates, into a parameter space, where a parameter is a radial distance from the point in Cartesian space. The density of the resultant point in parameter space represents the likelihood that a circle of radius r exists in the image, centered on the point in image space. This transformation is sometimes called a "Hough" transformation, although other terminologies and transformations may be used.

Transformations are made for a range of radii corresponding the an expected range of aortal radii so that a selection may be made of those points in coordinate space which have the highest likelihood of being the central point in a structure corresponding to a circle in the image space. The selection of candidate central positions may include a heuristic threshold (step 140) which may be dependent on the radius in Hough space. A plurality of candidate central positions may be identified, which may be termed "candidate centroid locations" (step 150). Centroid is intended to suggest that the structure may not be exactly circular, either in fact, or due to a non-orthogonality between the blood vessel and the image plane. As such, clusters of candidate centroid locations may be found, representing a slightly elliptical structure.

Figure 12:
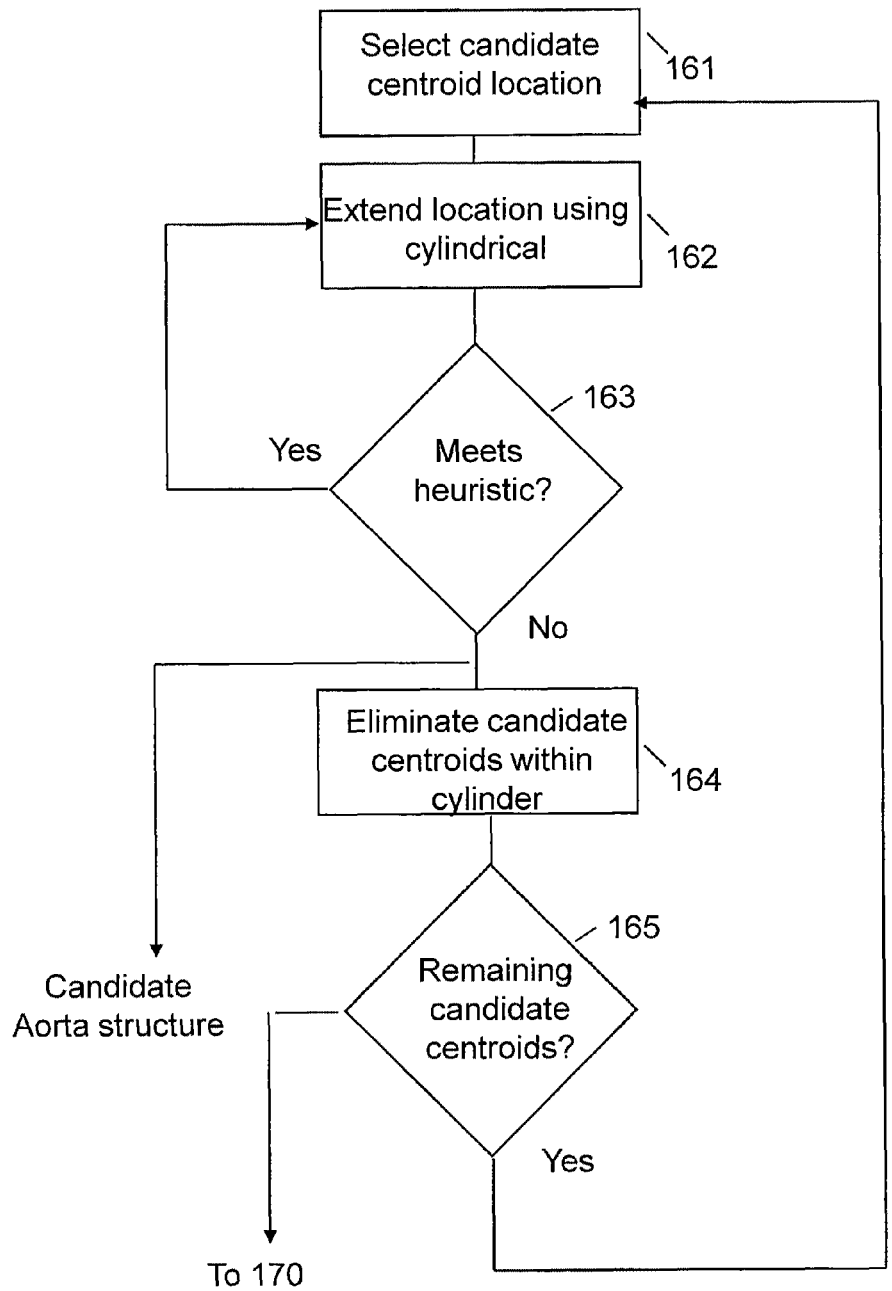
FIG. 12 is a detail of the steps of step 160 in FIG. 11.

To validate one of the candidate centroid locations (step 161; FIG. 12), the vessel initial location, defined by the point in Hough space is used to create an analytic cylinder oriented orthogonal to the image plane (step 161), and having a height. The height is chosen so that the cylinder may be extended upwards and downwards (step 162) from the starting point using a ray projection, or other technique to fit, for example, an ellipsoid to the new position of the cylinder. This extension may continue until the rate of change of major axis direction of the ellipsoid exceeds a threshold, or the minor axes of the ellipsoid fall below a size threshold (step 163). The approximately cylindrical structure defined by this process is a candidate to be the aorta.

As mentioned above, a slightly elliptical structure may have given rise to a plurality of candidate centroids. Since they likely represent the same structure, candidate points lying within the candidate aorta may be eliminated from consideration as being redundant (step 164). Remaining candidate centroid locations are evaluated in the same manner until all of the candidates have been processed (step 165). Each of the candidate aorta structures is evaluated to determine which of the candidates meets the established criteria for being the aorta. For example, the vessel exhibiting the aortic arch is selected (step 170).

Figure 13:
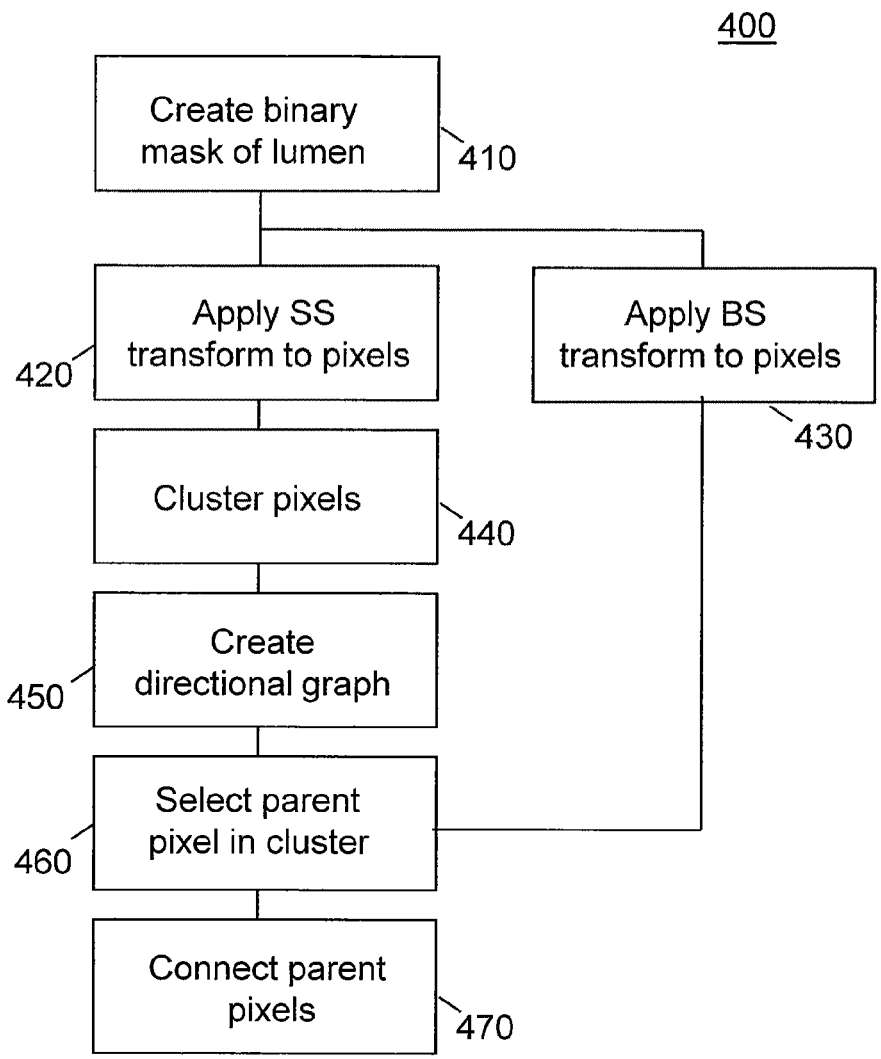
FIG. 13 is a detail of the steps of step 400 in FIG. 2.
Figure 14:
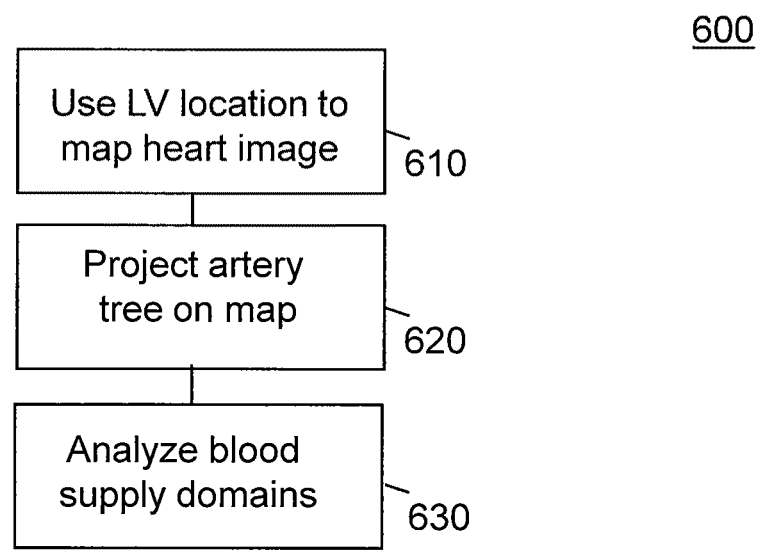
FIG. 14 is a detail of the steps of step 600 in FIG. 2.

Skeletonization (step 400; FIG. 13) is a process that simplifies the step 500 of assigning labels to portions of the tree and associating these portions with the location and orientation of the myocardium, which was found in step 200 through locating the left ventricle (LV).

The segmented coronary artery tree is skeletonized. A binary mask of the lumen is created (step 410). The binary mask assigns a value of "1" to all pixels within the segmented lumen, and a value of "0" to all other pixels. Thereafter, the binary mask is subjected to the SS and the BS transformations (steps 420 and 430), so that two different representations of the intra-luminal space are created. The SS transformation is used to cluster pixels having the closest spatial relationship (step 440) into a directed graph, while the BS transformation orders the clusters along the branches of the coronary arterial tree (step 460). The connected ordered parent pixels may be considered to represent the skeletonized coronary artery tree (step 470). This result is the line in FIG. 8A passing down the approximate center of the lumen and branching into two when the lumen branches.

The results of this method may be displayed in a variety of forms, and the one described herein is currently useful as it relates the individual patient morphology to the statistical morphology that is represented by the AHA 17-segment model. In step 600, the segmented heart is mapped so that the myocardium thereof corresponds to the polar map of the model (step 610). The identified major cardiac arteries (step 500) are now overlaid on the mapped myocardium so that the relationship between the myocardium and the supply vessels may be discerned (step 620).

In an aspect, the relationship between the major arteries and the region of the myocardium to which they supply blood may be defined (step 630) by use of a Voronoi diagram, depicting the regions on the basis of the closeness of each point in the region to the corresponding supply vessel.

Software expressing the steps of localizing the aorta and segmenting of the coronary artery tree was developed C++. Using the commercial software packages (Microsoft Visual C++2005 and "Mevislab 1.5, MeVis Medical Solutions AG, Bremen, Germany)

Steps in the method were evaluated using 30 randomly selected coronary computed tomography angiogram (CTA) image datasets of patients with coronary artery disease from various hospitals. All of the data sets had been acquired with a Siemens Somatom Sensation64 or a Siemens Somatom Definition. Success in performing the method was determined by comparing the automatic aorta localization and the automatic subdivision of the coronary artery tree with a localization of the aorta and a subdivision of the coronary tree performed by a qualified person in the profession. The evaluation was qualitative, and not quantitative, in the sense that the result was a binary decision that the method worked or did not work for a particular CTA image data set.

The method achieved a success rate of 93 percent in correct aorta localization. Automatic labeling of the coronary arteries was evaluated using 10 of the data sets, and the method described successfully segmented the coronary artery tree in each data set.

The method 5 may be performed by a computer having connectivity to a data base of images. The images may be retrieved over a network and processed by the computer using software programs to perform the steps of the method described above.

Figure 15:
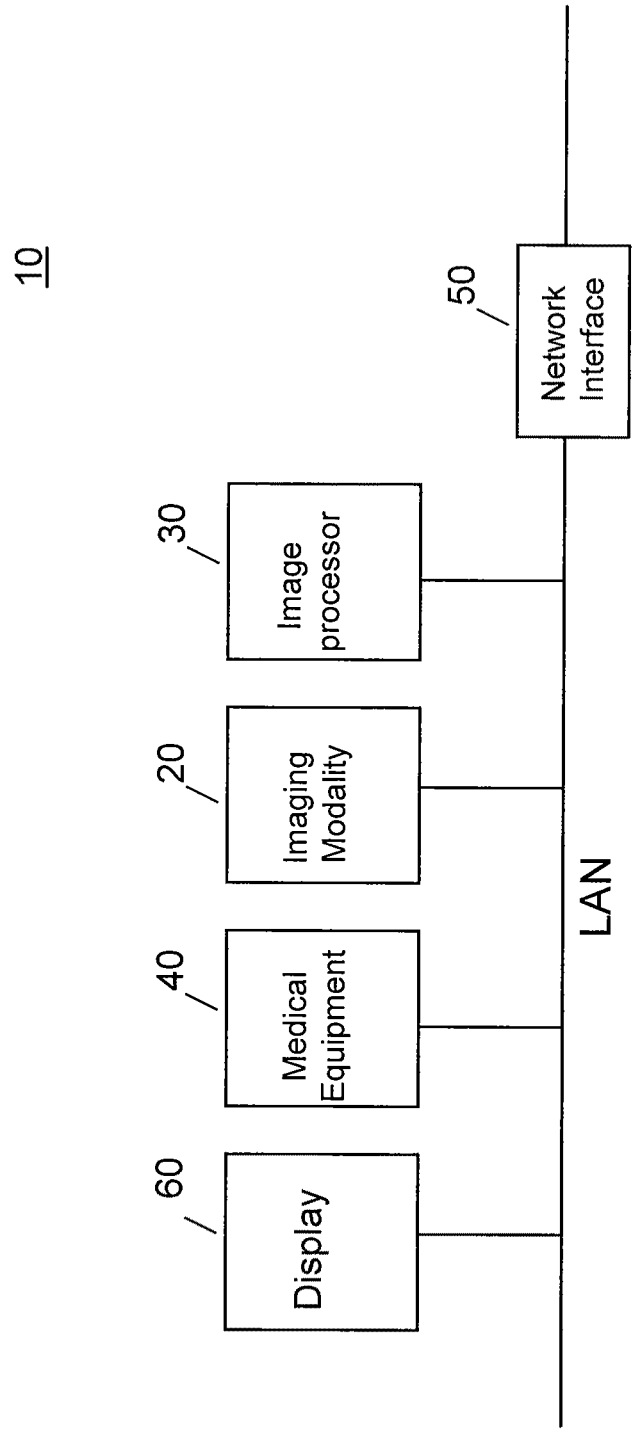
FIG. 15 is a block diagram of an equipment suite suitable for performing the method of FIG. 2, according to an embodiment.

The methods described herein may be used in a medical facility in conjunction with a treatment suite 10 shown in FIG. 15, which may be suitable for diagnostic or therapeutic functions, which may include some of the following equipment types for performing diagnosis and treatment of a patient: an imaging modality 20 which may be a computed tomography device (CT), magnetic resonance imager (MRI) or a C-arm X-ray device; one or more of: an image processor 30 for at least one of soft tissue or angiographic image data obtained by the imaging modality; a sensor for detecting patient motion 40; a processor for motion correction of images for patient motions; a patient monitor, which may include a vital signs monitor and an EKG; a computer and interface for entering patient data. The treatment suite may further include data interface 50 with a local area network or a wide area network. Suitable image and data display devices 60 such as flat panel video displays may also be provided.

The combination of hardware and software to accomplish the tasks described herein may be termed a platform or "therapy unit". The instructions for implementing processes of the platform may be provided on computer-readable storage media or memories, such as a cache, buffer, RAM, removable media, hard drive or other computer readable storage media. Computer readable storage media include various types of volatile and nonvolatile storage media. The functions, acts or tasks illustrated or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Some aspects of the functions, acts, or tasks may be performed by dedicated hardware, or manually by an operator.

In an embodiment, the instructions may be stored on a removable media device for reading by local or remote systems. In other embodiments, the instructions may be stored in a remote location for transfer through a computer network, a local or wide area network, by wireless techniques, or over telephone lines. In yet other embodiments, the instructions are stored within a given computer, system, or device.

Where the term "data network", "web" or "Internet" is used, the intent is to describe an internetworking environment, including both local and wide area networks, where defined transmission protocols are used to facilitate communications between diverse, possibly geographically dispersed, entities. An example of such an environment is the world-wide-web (WWW) and the use of the TCP/IP data packet protocol, and the use of Ethernet or other known or later developed hardware and software protocols for some of the data paths. Often the internetworking environment is provided, in whole or in part, as an attribute of the facility in which the platform is located.

Communications between the devices, systems and applications may be by the use of either wired or wireless connections. Wireless communication may include, audio, radio, lightwave or other technique not requiring a physical connection between a transmitting device and a corresponding receiving device. While the communication may be described as being from a transmitter to a receiver, this does not exclude the reverse path, and a wireless communications device may include both transmitting and receiving functions. Such wireless communication may be performed by electronic devices capable of modulating data as signals on carrier waves for transmission, and receiving and demodulating such signals to recover the data. The devices may be compatible with an industry standard protocol such as IEEE 802.11b/g, or other protocols that exist, or may be developed.

The sensor portions of the therapy unit 10 may be located in a therapy room, and some or all of the signal and data processing and data display may also be located in the therapy room; however, some or all of the equipment and functionality, not directly associated with the sensing of the patient, may be remotely located. Such remote location of portions of the equipment may be facilitated by high-speed data communications on local-area networks, wide-area networks, or the Internet. The therapy unit may thus be located remotely from the specialists making the diagnosis and for determining the appropriate course of treatment. Of course, the specialists may also be present with the patient in the treatment room.

A computer program product is described, stored on digital media and capable of being read by a computer so as to configure the computer to perform a method of automatically determining coronary blood supply to regions of the myocardium or other structure, where the method includes the steps of receiving imaging modality data for a patient, localization of the aorta, localizing the left ventricle, segmenting the coronary artery tree, optionally, skeletonization of the coronary artery tree, automatically labeling the coronary artery tree, and, associating the labeled coronary arteries with regions of the myocardium. The computer program product comprises the computer code that configures the computer to process the data substantially in accordance with the steps of the method of FIG. 2.

While the methods disclosed herein have been described and shown with reference to particular steps performed in a particular order, it will be understood that these steps may be combined, sub-divided, or reordered to from an equivalent method without departing from the teachings of the present invention. For example, the steps of localizing the left ventricle, and projecting the left ventricle into the polar map may be performed independently of localizing he aorta. Accordingly, unless specifically indicated herein, the order and grouping of steps is not a limitation of the present invention.

Although only a few exemplary embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims.

What is claimed is:

1. A method of automatically associating coronary arteries with respect to a portion of a patient heart using three dimensional image data, the method comprising:
   automatically determining, using a processor, a location of an aorta by applying heuristics to an axial image slice after the three dimensional image data is obtained, such that the processor determines the location of the aorta without user interaction indicating the location of the aorta;
   determining a location of a left ventricle;
   using the determined aorta location as a starting location for segmenting a coronary artery tree; and
   associating a coronary artery of the coronary artery tree with a location of the portion of the patient heart,
   wherein the determining of the location of the aorta comprises:
      selecting an axial slice of an angiogram image, the axial slice including the aorta;
      identifying a plurality of candidate aorta centroid locations using a first heuristic based on the selected axial slice; and
      selecting a candidate aorta centroid location that represents the aorta from the plurality of candidate aorta centroid locations, and identifying a lumen surface of the aorta, the selecting of the candidate aorta centroid location that represents the aorta comprising evaluating the plurality of candidate aorta centroid locations.

2. The method of claim 1, wherein identifying candidate aorta centroid locations includes mapping information from image space into parameter space.

3. The method of claim 2, wherein identifying candidate aorta centroid locations includes selecting an image space coordinate corresponding to a parameter space coordinate, wherein a value in coordinate space is based on a second heuristic.

4. The method of claim 3, wherein the second heuristic is a threshold that depends on a radius.

5. The method of claim 1, wherein evaluating the candidate aorta centroid locations includes forming a cylindrical representation of the lumen surface in the vicinity of the candidate aorta centroid location, and extending the cylindrical representation until an axial direction or size of the cylindrical representation fails to meet a third heuristic.

6. The method of claim 5, wherein candidate points within the extended cylindrical representation are discarded, and a remaining candidate point is selected, and
   wherein evaluation of the candidate aorta centroid location is performed.

7. The method of claim 6, further comprising evaluating each extended cylindrical representation to determine the extended cylindrical representation corresponding to the aorta.

8. The method of claim 7, wherein a fourth heuristic is that the aorta is the extended cylindrical representation that contains an arch structure or, if none of the extended cylindrical representations contains an arch structure, the extended cylindrical representation with the largest radius at an end point thereof is selected as the aorta.

9. The method of claim 1, further comprising further extending the extended cylindrical representation so as to identify a location of the left ventricle.

10. The method of claim 1, wherein each of a left coronary artery (LCA) and a right coronary artery (RCA) of the coronary artery tree are identified by an orientation with respect to the location of the left ventricle (LV).

11. The method of claim 10, further comprising identifying a left descending coronary artery (LAD) and a left circumflex coronary artery (LCX) artery of the coronary artery tree using a relative location of each of the LAD and the LCX with respect to the location of the LV.

12. The method of claim 11, further comprising associating the identified arteries of the coronary artery tree with spatial locations on a myocardium of the patient.

13. The method of claim 12, further comprising mapping the myocardium of the patient onto a polar coordinate system so that regions of the myocardium are identifiable by an American Heart Association (AHA) 17 component spatial model.

14. The method of claim 13, wherein the identified arteries are superimposed on the AHA spatial model, and
   wherein the method further comprises defining a supply region for blood from the identified arteries.

15. The method of claim 14, wherein defining the supply region is performed using a Voronoi transformation.

16. The method of claim 1, wherein the three dimensional image data is obtained after injecting the patient with a contrast agent.

17. The method of claim 1, wherein the three dimensional image data is obtained by a computed tomography device.

18. The method of claim 17, wherein the computed tomography device is an X-ray device or a magnetic resonance imaging device.

19. The method of claim 1, further comprising mapping branches of the coronary artery tree onto the polar map, the mapping comprising computing a ray from each pixel of the polar-mapped image to determine when the ray intersects with the coronary artery tree.

20. A non-transitory computer readable storage medium storing a program that causes a computer to:
   configure a computer to analyze three dimensional image data of a patient to perform the acts of:
      automatically identifying a location of an aorta by applying heuristics to an axial image slice after the three dimensional image data is obtained, such that the computer determines the location of the aorta without user interaction indicating the location of the aorta;
      determining a location of a left ventricle;

using the location of the aorta as a starting location for segmenting a coronary artery tree; and associating a coronary artery of the coronary artery tree with a location of a portion of a patient heart, wherein the identifying of the location of the aorta comprises:

selecting an axial slice of an angiogram image, the axial slice including the aorta;

identifying a plurality of candidate aorta centroid locations using a first heuristic based on the axial slice; and selecting a candidate aorta centroid location that represents the aorta from the plurality of candidate aorta centroid locations, and identifying a lumen surface of the aorta, the selecting of the candidate aorta centroid location that represents the aorta comprising evaluating the plurality of candidate aorta centroid locations.

21. The non-transitory computer readable medium of claim 20, wherein identifying the location of the aorta is performed by mapping in Hough space.

22. The non-transitory computer readable medium of claim 20, wherein the association of the coronary artery of the coronary artery tree with the portion of the patient heart is performed using a Voronoi transformation.

23. The non-transitory computer readable medium of claim 20, wherein the segmenting of the coronary artery tree includes skeletonization, and wherein the skeletonization is performed using at least one of a boundary seeded transform and a single seeded transform.

24. The non-transitory computer readable medium of claim 23, wherein arteries of the skeletonized coronary artery tree are identified.

25. A system for diagnosing a patient, the system comprising:

a graphical display; and a computer configured to receive image data from a three dimensional data set obtained by an imaging modality, and configured to:

use an image slice from the three dimensional data set, wherein an aorta of the patient is disposed substantially orthogonal to a plane of the image slice, and determine a plurality of candidate lumen centroids of the aorta based on the image slice;

validate a centroid as corresponding to the aorta, the validation comprising selection of a candidate lumen centroid that represents the aorta from the plurality of candidate lumen centroids, the selection of the candidate lumen centroid that represents the aorta comprising an evaluation of the plurality of candidate lumen centroids;

identify a lumen surface of the aorta;

use the centroid as a starting location to segment the aorta and a coronary artery tree;

identify arteries of the coronary artery tree;

associate the identified arteries of the coronary artery tree with spatial locations on a myocardium of the patient; and display a map of the myocardium on the graphical display with the identified arteries superimposed on the displayed map of the myocardium.

26. The system of claim 25, further comprising a network interface configured to receive the three dimensional data set obtained by the imaging modality data over a network.

* * * * *